(12) United States Patent
Frey, Jr.

(10) Patent No.: US 6,369,749 B1
(45) Date of Patent: Apr. 9, 2002

(54) ADAPTIVE CONTROL OF THE DETECTION THRESHOLD OF A BINARY INTEGRATOR

(75) Inventor: Thomas Lawrence Frey, Jr., Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/656,917

(22) Filed: Sep. 7, 2000

(51) Int. Cl.[7] .................................................. G01S 7/34
(52) U.S. Cl. .............................. 342/93; 342/89; 342/91; 342/159; 342/195
(58) Field of Search ............................... 342/89, 90, 91, 342/92, 93, 159, 175, 195

(56) References Cited

U.S. PATENT DOCUMENTS 4,489,319 A * 12/1984 Hansen ........................ 342/93
4,513,286 A * 4/1985 Irabu ........................... 342/93

FOREIGN PATENT DOCUMENTS

DE            3434326 A1 * 3/1986 ............. G01S/7/28

* cited by examiner

Primary Examiner—Bernarr E. Gregory
(74) Attorney, Agent, or Firm—Jackson Walker LLP

(57) ABSTRACT

The present invention provide a method and system of dynamically estimating a coefficient of variation of the fluctuation of a waveform and an optimal binary detection threshold using the estimated coefficient of variation. The system discriminates between noise signals and signal-plus-noise signals of a digitized signal by comparison with a threshold. The noise and signal-plus-noise signals are further used to determine a mean noise floor level and a standard deviation, respectively. Subsequently, the system determines the coefficient of variation based on the ratio of standard deviation to mean. The optimal binary detection threshold is calculated using the coefficient of variation, presets for cumulative probability of false alarm and collection time.

18 Claims, 3 Drawing Sheets

| Distribution | Mean | Standard Deviation | Coefficient of Variation $(\frac{\sigma}{\mu})$ |
|---|---|---|---|
| Steady - non-fluctuating $f(x)=\mu_o$ | $\mu_o$ | 0 | 0 |
| Exponential – Swerling II $f(x)=\lambda \cdot e^{-\lambda x} U(x)$ | $\frac{1}{\lambda}$ | $\frac{1}{\lambda}$ | 1 |
| Rayleigh – Swerling IV $f(x)=\frac{x}{\alpha^2} e^{\left(\frac{-x^2}{2\alpha^2}\right)} U(x)$ | $\alpha\sqrt{\frac{\pi}{2}}$ | $\alpha \cdot \sqrt{2-\frac{\pi}{2}}$ | 0.52 |

Figure 3

ADAPTIVE CONTROL OF THE DETECTION THRESHOLD OF A BINARY INTEGRATOR

BACKGROUND OF THE INVENTION

1. Technical Field of the Invention

The present invention relates generally to the field of signal detection and, more particularly, to adaptive control of a detection threshold.

2. Description of Related Art

A radar system measures the distance and/or velocity of a target by sensing the effects of the interaction of the target with a beam of continuous or pulsed electromagnetic energy. The radar receiver measures the distance to the target from differences in the time, for example, between the received and transmitted signal. When the radar energy reaches a target, some portion is reflected back at the radar receiver. This is referred to as backscatter. The portion of the energy that is scattered back at the receiver is determined by the radar cross section (RCS) of the target. The backscatter is not normally constant with time, but fluctuates based on small changes in orientation. In 1954, Peter Swerling described two different categories of fluctuation: pulse-to-pulse and scan-to-scan. "Pulse-to-pulse" described targets and pulse rates where the amplitude of the backscatter from pulse to pulse varied significantly and was uncorrelated from one pulse to the next pulse. "Scan-to-Scan" described targets and pulse rates where the amplitude of the backscatter from pulse to pulse is correlated and relatively stable, but changes significantly from one scan of the radar to the next scan.

Radar systems must be operable in environments, which limit radar performance. Internal noise of the system as well as undesirable echoes due to rain, land and sea returns, for example, make target discrimination more difficult often overloading the signal processor that is tracking the target of interest. To distinguish the echo resulting from a target from undesired echoes and/or noise, a field of adaptive or mean level detection has developed.

In order to counteract the above-described problem, statistical techniques were developed to compare the power level of a cell of interest with the detection threshold to indicate whether a target is located in the cell of interest with a specific probability of false alarm. Some techniques use a detection threshold that is determined from a known mean level of undesirable echoes and noise. The objective is to provide a constant false-alarm rate while maintaining detection probabilities for known signals of interest.

For digital type radar equipment and passive detection systems, current methods select binary integration thresholds from a estimate of the backscatter fluctuation statistics from one of the four Swerling models. Binary Integration, better known as "M of N detection", refers to a series of statistical experiments mathematically described by the binomial equation. "N" refers to the number of independent trials (samples or pulses) and "M" refers to the number of required favorable outcomes (samples or pulse above a threshold) within the "N" trials. In current applications a fixed value threshold is used, however, this approach leads to reduced sensitivity and an inability to adapt to dynamic background effects, such as energy fluctuation and scintillation.

Because current methods offer no method to dynamically adapt to the real-time fluctuations, optimal performance is only attained for a few standard fluctuation cases. Therefore, there is a need for a method to detect changes in signal fluctuation, and adapt the detection scheme to maintain a high level of sensitivity within a single system.

SUMMARY OF THE INVENTION

The present invention achieves technical advantages as an apparatus, method and system of dynamically estimating a coefficient of variation of the fluctuation of a waveform and an optimal binary detection threshold using the estimated coefficient of variation. Initially, an A/D converter receives an analog waveform signal and converts the signal to digital form, which is fed to a hard thresholding unit. The hard thresholding unit discriminates between a noise signal and a signal-plus-noise signal by comparison with a threshold in which the noise signal is used to estimate a mean noise floor level and the signal-plus-noise is used to estimate a standard deviation. The hard thresholding unit further determines the coefficient of variation based on the ratio of standard deviation to mean. An optimal threshold estimator uses the estimated coefficient of variation, presets for cumulative probability of false alarm and collection time to determine the optimal binary detection threshold.

BRIEF DESCRIPTION OF THE DRAWINGS

For a more complete understanding of the present invention, reference is made to the following detailed description taken in conjunction with the accompanying drawings wherein:

FIG. 3 show a table of parameters for various Swerling Fluctuation models.

DETAILED DESCRIPTION OF THE INVENTION

The numerous innovative teachings of the present applications will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Figure 1:
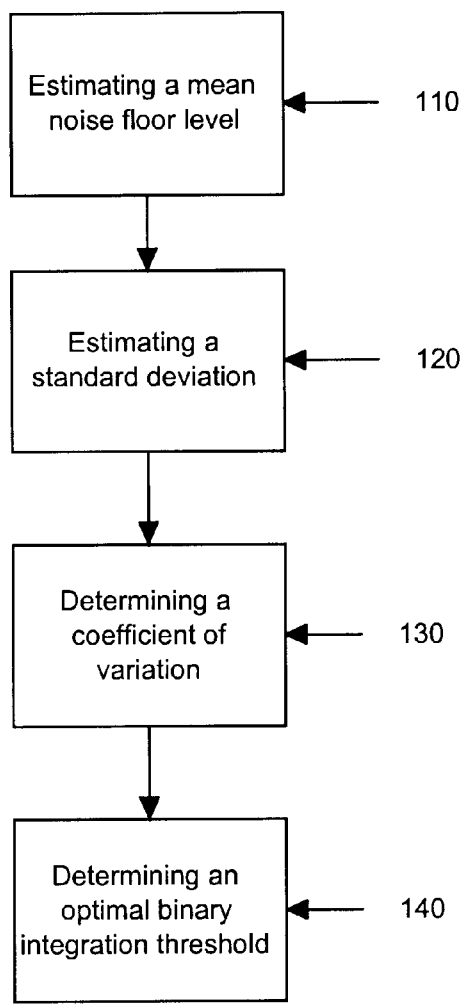
FIG. 1 illustrates a method of determining an optimal binary detection threshold in accordance with the present invention.

Referring to FIG. 1 there is illustrated a method of determining an optimal binary detection threshold in accordance with the present invention. Initially, a digital sample of a received signal is compared to a predetermined threshold value. The sample is defined as either noise or a signal of interest plus noise. Samples meeting or exceeding the predetermined threshold are declared "signal plus noise." Samples not meeting the threshold are declared "noise" and are subsequently either passed unmodified or is set to zero depending on the application.

From the sample declared as noise, an average (mean) noise floor level is estimated 110. The threshold is set based on the estimated mean noise floor level. In a further operation, a standard deviation is determined 120. The standard deviation is determined from those received samples, which are declared as "signal plus noise."

In a subsequent act, a coefficient of variation (COV) is determined 130 by the ratio of the estimate of the standard deviation to the estimate of the mean. The COV, user presets for probability of false alarm, and number of samples (N) are used to estimate an optimal binary detection threshold (M)

140. The "M of N" criteria is finally used for binary integration to produce detection reports. Binary Integration, better known as "M of N" detection, refers to a series of statistical experiments mathematically described by the binomial equation. "N" refers to the number of independent trials (samples or pulses) and "M" refers to the number of required favorable outcomes (samples or pulse above a threshold) within the "N" trials.

The above-described method produces an optimal binary detection threshold as a function of the COV allowing for an adaptive detection scheme to improve sensitivity in binary integration applications, such as the detection of radar energy from aircraft, where there exists energy fluctuation, scintillation, and/or geometry changes.

Figure 2:
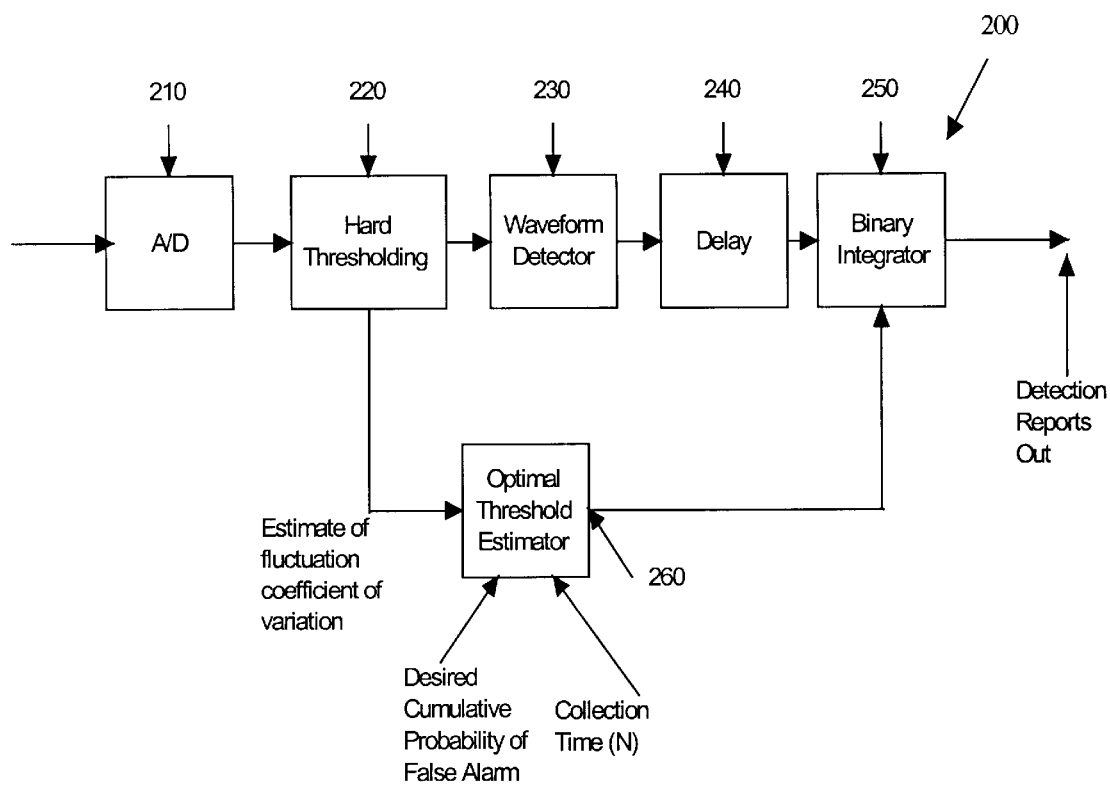
FIG. 2 illustrates a block diagram of a preferred detection system in accordance with the present invention.

Referring now to FIG. 2 there is illustrated a block diagram of a preferred detection system 200 in accordance with the present invention. An analog to digital (A/D) converter 210 first receives a signal and samples the analog waveform at discrete points, thus, converting the signal to digital form at a rate appropriate for the waveform being sampled. The converter 210 can be constructed as a conventional A/D converter known in the art. Subsequently, the digital sample is fed to a hard thresholding unit 220.

The hard thresholding unit 220 compares the sample (noise or signal-plus-noise) to a predetermined threshold value. Samples meeting or exceeding the threshold value are declared signal-plus-noise, and samples falling below the threshold value are declared noise and are either passed unmodified or is set to zero depending on the application (this is referred to as the constant false alarm rate level). The hard thresholding unit 220 also estimates the average (mean) noise floor level based on the samples that are declared as noise. The determined estimated mean noise floor level is used to set the threshold. Further, the hard thresholding unit 220 estimates the standard deviation of the samples that are declared signal-plus-noise and finally determines a coefficient of variation (COV) based on the ratio of the standard deviation to the mean.

Subsequent to the hard thresholding, a waveform detector 230 performs pulse detection to determine if a pulse or pulse pattern of interest is present based on the samples. In a preferred embodiment, the waveform detector 230 consists of a smoothing filter to account for noise spikes, pulse width detection logic, and a preamble detector. The output of the waveform detector 230 is a trigger or flag in a preferred embodiment, indicating a desired event was detected. These desired events are subsequently input into the binary integrator 250.

Prior to input of the desired events to the binary integrator 250, a delay unit 240 delays the binary integration by a fixed amount of time to account for the processing in the hard thresholding unit 220 and in an optimal threshold estimator 260 which is further described below in the following detailed description. The binary integrator 250 is a buffer, in a preferred embodiment, that sums the number of triggers or flags within its buffer for every sample (N samples). If the number exceeds the integration threshold (M samples), a valid detection report is generated. In a preferred embodiment, the buffer is cleared after a valid detection report.

The Optimal Threshold Estimator (OTE) 260 imports the current estimate of the COV, from the hard thresholding unit 210, along with the user presets for desired cumulative probability of false alarm and collection time (N) to estimate the optimal binary detection threshold (M). The OTE 260 subsequently provides the M of N criteria to the binary integrator 250.

In current applications, a fixed value is used for one or both M and N. However, analysis has shown that in applications where energy fluctuation or scintillation exist, an optimal detection threshold is a function of the coefficient of variation. In an application comprising detection of radar energy from an aircraft, for example, as the geometry changes the coefficient of variation can also vary. Use of a fixed value in the above-described exemplary cases lead to a loss in sensitivity (gain). The present invention allows a system to detect changes in signal fluctuation and adapt the detection scheme to maintain maximum sensitivity.

The current approach is to choose a fixed "M of N" criteria and to accept the performance degradation. The approach of the present invention is superior because it allows, for example, the system to adapt to the current statistics of the signal. The new approach is fundamentally implemented in the hard thresholding unit 220 and in the OTE 260. The hard thresholding unit 220 adds the ability to measure the mean of only the noise and the standard deviation of the variance of only the signal-plus-noise in a preferred embodiment. These values are subsequently used to calculate the COV. Further, the OTE 260 implements a new mathematical algorithm using the determined COV, the probability of false alarm, and the collection time (N) to calculate the optimal binary detection threshold (M).

A first inventive aspect of the new mathematical algorithm calculates the optimal binary detection threshold based on observable attributes of the signal in real time. Previously, information of target fluctuation primarily address three types of fluctuation: non-fluctuating (Rician), exponentially fluctuating (Swerling I & II), and Raleigh fluctuating (Swerling III & IV). The equation in accordance with the present application interpolates between the cases.

Another inventive aspect is the realization of a preprocessor designed to measure the necessary signal parameter (specifically the coefficient of variation) during the collection period while delaying the final binary integration until after the optimal threshold is calculated and applied. The ability to implement this in a preprocess allows the solution to continuously operate in real-time without limitations on data rate or processing speeds.

A means of comparing the signal fluctuation is in terms of standard deviation of the fluctuation of a sampled signal normalized by its mean, referred to as the COV, expressed as:

$$\text{Coefficient of Variation} = \frac{\sigma}{\mu}, \qquad \text{Equation 1}$$

where $\sigma$ is the standard deviation of the fluctuation and $\mu$ is the mean of the fluctuation. The mean, standard deviation, and COV for the various Swerling fluctuation models are given in FIG. 3 in which U(x) is a step function set equal to 0 for X<0 and set to 1 for x=0. Note that for the Swerling models these coefficients are between zero and one. The concept of various Swerling Fluctuation models are described in detail in Miller, I and Freund, J. E., Probability and Statistics for Engineers, second edition, Prentice-Hall, Inc., 1977, and Swerling, P. J., Probability of Detection for Fluctuating Targets, The RAND Corporation, Research Memorandum RM-1217, Mar. 17, 1954, and can be referred, if necessary, for a better understanding of Swerling type models.

The "M of N" detection criteria can be expressed in terms of a ratio called the detection threshold ($\alpha$) where:

$$\alpha = \frac{M}{N}. \qquad \text{Equation 2}$$

A linear estimate, in accordance with the present invention, that expresses optimal binary detection threshold for intermediate targets in terms of the developed estimates is expressed as:

$$\hat{\alpha}_{threshold} \approx (1-\eta)\hat{\alpha}_{NF} + \eta\hat{\alpha}_{SII}, \qquad \text{Equation 3}$$

where $\hat{\alpha}_{NF}$ is the estimate of the optimal detection threshold for the non-fluctuating target model, $\hat{\alpha}_{SII}$ is the estimate of the optimal detection threshold for the Swerling II target model, and $\eta$ is the coefficient of variation defined as:

$$\eta = \begin{cases} \dfrac{\sigma}{\mu} & \text{pulse-to-pulse} \\ 0 & \text{scan-to-scan.} \end{cases} \qquad \text{Equation 4}$$

In 1954, Peter Swerling described two different categories of fluctuation: pulse-to-pulse and scan-to-scan. "Pulse-to-pulse" described targets and pulse rates where the amplitude of the backscatter from pulse to pulse varied significantly and was uncorrelated from one pulse to the next pulse. "Scan-to-Scan" described targets and pulse rates where the amplitude of the backscatter from pulse to pulse is correlated and relatively stable, but changes significantly from one scan of the radar to the next scan. Details are set forth in Swerling, P. J., "Probability of Detection for Fluctuating Targets", The RAND Corporation, Research Memorandum RM-1217, Mar. 17, 1954, the disclosure of which is incorporated herein by reference.

Also, in accordance with the present invention, an approximation for the optimal detection threshold for non-fluctuating and Swerling II targets is shown by:

$$\hat{\alpha}_{SII} = \exp\left(\frac{-1}{1 + g(N, F_{MN})}\right) \qquad \text{Equation 5}$$

wherein, $$g(N, F_{MN}) = \left[\frac{0.1991N - 0.209}{\ln(F_{MN}) + 0.1896 - 0.66N + 0.5 \cdot \ln(N)}\right] \text{ and } \qquad \text{Equation 6}$$

$$\hat{\alpha}_{NF} = 0.88 + \left[\frac{2.46\sqrt{N}}{\ln(F_{MN}) + a_3 + Na_4 + 0.5 \cdot \ln(N)}\right] \qquad \text{Equation 7}$$

wherein, $$\alpha_3 = 0.5 \cdot \ln[2\pi\zeta(1-\zeta)] \qquad \text{Equation 8}$$

$$\alpha_4 = \zeta \cdot \ln(\zeta) + (1-\zeta) \cdot \ln(1-\zeta) \qquad \text{Equation 9}$$

$$\xi = \frac{1.5}{\sqrt{N}}. \qquad \text{Equation 10}$$

$F_{MN}$ is the desired cumulative probability of false alarm and N number of pulses (N>2). Note, the above-described equations are independent of the desired cumulative probability of detection.

This new approach is superior because it allows the system to adapt to the current statistics of the signal and maximize the sensitivity of the detector to those statistics. For example, for a probability of detection of 0.5, a probability of false alarm of $10^{-6}$, and N=10, the lost gain varies from a fraction of a dB to over 8 dB depending of the specific criteria chosen.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method of adaptively selecting a binary detection threshold for binary integration based on observed target fluctuation statistics to provide improved detector sensitivity, comprising the steps of:

estimating a mean noise level of a signal sample;

estimating a standard deviation of said signal sample;

determining a coefficient of variation; and determining said binary detection threshold from said determined coefficient of variation.

2. The method of claim 1 further comprising the steps of:

declaring said signal samples falling below a first threshold as noise; otherwise declaring said signal samples as signal-plus-noise, wherein said mean noise level is estimated from said noise signal samples and said standard deviation is estimated from said signal-plus-noise signal samples.

3. The method of claim 1, wherein said coefficient of variation is defined as:

$$\text{coefficient of variation} = \frac{\sigma}{\mu},$$

wherein $\sigma$ represents said standard deviation and $\mu$ represents said mean noise level.

4. The method of claim 1 further comprising the steps of:

establishing a preset for probability of false alarm; and determining a number of samples.

5. The method of claim 4, wherein said binary detection threshold is further determined from said preset for probability of false alarm and said number of samples.

6. The method of claim 5, wherein said binary detection threshold is further determined by interpolation between estimates of detection threshold for non-fluctuating and Swerling type fluctuation target models.

7. The method of claim 1, wherein said binary detection threshold is defined by:

$$\hat{\alpha}_{threshold} \approx (1-\eta)\hat{\alpha}_{NF} + \eta\hat{\alpha}_{SII},$$

wherein $\hat{\alpha}_{NF}$ is an estimated detection threshold for a non-fluctuating target model, $\hat{\alpha}_{SII}$ is an estimated detection threshold for a Swerling II target model, and $\eta$, is said coefficient of variation defined as:

$$\eta = \begin{cases} \dfrac{\sigma}{\mu} & \text{pulse-to-pulse} \\ 0 & \text{scan-to-scan} \end{cases}.$$

8. The method of claim 7, wherein said estimated detection threshold for said non-fluctuating and Swerling II target models are further defined as:

$$\hat{\alpha}_{SII} = \exp\left(\frac{-1}{1 + g(N, F_{MN})}\right),$$

wherein, $$g(N, F_{MN}) = \left[\frac{0.1991N - 0.209}{\ln(F_{MN}) + 0.1896 - 0.66N + 0.5 \cdot \ln(N)}\right],$$

and $$\hat{\alpha}_{NF} = 0.88 + \left[\frac{2.46\sqrt{N}}{\ln(F_{MN}) + a_3 + Na_4 + 0.5 \cdot \ln(N)}\right],$$

wherein, $$\alpha_3 = 0.5 \cdot \ln[2\pi\xi(1-\xi)],$$

and $$\alpha_4 = \xi \cdot \ln(\xi) + (1-\xi) \cdot \ln(1-\xi),$$

and $$\xi = \frac{1.5}{\sqrt{N}},$$

wherein $F_{MN}$ is said predetermined probability of false alarm and N is said number of samples.

9. A method of adaptively selecting a binary detection threshold for binary integration to provide improved detector sensitivity, comprising the steps of:

receiving an analog signal;

converting said analog signal to a digital signal;

comparing said digital signal to a predetermined threshold;

declaring said digital signal falling below a first threshold as noise and otherwise as signal-plus-noise;

estimating a mean noise level from said declared noise signal;

estimating a standard deviation from said declared signal-plus-noise signal;

determining a coefficient of variation, said coefficient of variation defined as a ratio of said mean noise level to said standard deviation; and determining said binary detection threshold from said coefficient of variation.

10. The method of claim 9, wherein said binary detection threshold is further a function of an estimated detection threshold for non-fluctuating and Swerling type Fluctuation target models.

11. The method of claim 9, wherein said binary detection threshold is defined by:

$$\hat{\alpha}_{threshold} = (1-\eta)\hat{\alpha}_{NF} + \eta\hat{\alpha}_{SII},$$

wherein $\hat{\alpha}_{NF}$ is an estimated detection threshold for a non-fluctuating target model, $\hat{\alpha}_{SII}$ is an estimated detection threshold for a Swerling II target model.

12. A system for adaptively selecting a binary detection threshold for binary integration to provide improved detector sensitivity, comprising:

thresholding unit for comparing a received digital sample to a first threshold declaring samples falling below said first threshold value as noise and otherwise as signal-plus-noise, said thresholding unit further estimating a mean noise level from said declared noise samples and a standard deviation from said declared signal-plus-noise samples, said thresholding unit further determining a coefficient of variation from said estimated mean noise level and standard deviation;

and optimal threshold estimator for receiving said coefficient of variation, a predetermined probability of false alarm and a number of samples to estimate a corresponding binary detection threshold.

13. The system of claim 12 further comprising:

waveform detector for performing a pulse detection of said digital sample to detect a predetermined pulse of interest, wherein said waveform detector receives said digital sample from said thresholding unit; and delay unit for delaying said binary integration by a fixed time corresponding to a processing time of said thresholding unit and optimal threshold estimator.

14. The system of claim 13, wherein said waveform detector comprises:

smoothing filter for detecting noise spikes; pulse width detection logic; and preamble detector.

15. The system of claim 12, wherein said coefficient of variation is defined as:

$$\text{coefficient of variation} = \frac{\sigma}{\mu},$$

wherein $\sigma$ represents said standard deviation and $\mu$ represents said mean noise level.

16. The system of claim 12, wherein said binary detection threshold is determined by interpolation between estimates of an detection threshold for non-fluctuating and Swerling type fluctuation target models.

17. The system of claim 12, wherein said detection binary threshold is further defined by:

$$\hat{\alpha}_{threshold} = (1-\eta)\hat{\alpha}_{NF} + \eta\hat{\alpha}_{SII},$$

wherein $\hat{\alpha}_{NF}$ is an estimated detection threshold for a non-fluctuating target model, $\hat{\alpha}_{SII}$ is an estimated detection threshold for a Swerling II target model, and $\eta$ is said coefficient of variation defined as:

$$\eta = \begin{cases} \frac{\sigma}{\mu} & \text{pulse-to-pulse} \\ 0 & \text{scan-to-scan} \end{cases}.$$

18. The system of claim 17, wherein said estimated detection threshold for non-fluctuating and Swerling II target models are further defined as:

$$\hat{\alpha}_{SII} = \exp\left(\frac{-1}{1 + g(N, F_{MN})}\right),$$

wherein, $$g(N, F_{MN}) = \left[\frac{0.1991N - 0.209}{\ln(F_{MN}) + 0.1896 - 0.66N + 0.5 \cdot \ln(N)}\right],$$

and $$\hat{\alpha}_{NF} = 0.88 + \left[\frac{2.46\sqrt{N}}{\ln(F_{MN}) + a_3 + Na_4 + 0.5 \cdot \ln(N)}\right],$$

wherein, $\alpha_3 = 0.5 \cdot \ln[2\pi\xi(1-\xi)]$, and $\alpha_4 = \xi\ln(\xi) + (1-\xi)\cdot\ln(1-\xi)$, $$\xi = \frac{1.5}{\sqrt{N}},$$

wherein $F_{MN}$ is said predetermined probability of false alarm and N is said number of samples.

* * * * *